United States Patent

Shimada et al.

(10) Patent No.: US 6,826,344 B2
(45) Date of Patent: Nov. 30, 2004

(54) OPTICAL ELEMENT AND METHOD OF FABRICATION THEREOF

(75) Inventors: Mikihiro Shimada, Kadoma (JP); Tsuguhiro Korenaga, Katano (JP); Masanori Iida, Katano (JP); Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/935,027

(22) Filed: Aug. 22, 2001

(65) Prior Publication Data

US 2002/0025134 A1 Feb. 28, 2002

(30) Foreign Application Priority Data

Aug. 23, 2000 (JP) .................................. 2000-252519

(51) Int. Cl.⁷ ................................................ G02B 6/10
(52) U.S. Cl. ...................................................... 385/129
(58) Field of Search ............................. 385/1, 2, 16, 37, 385/129, 130, 131, 132

(56) References Cited

U.S. PATENT DOCUMENTS

| | | | |
|---|---|---|---|
| 3,814,498 A | | 6/1974 | Tomlinson, III et al. |
| 3,970,959 A | | 7/1976 | Wang et al. |
| 4,886,538 A | | 12/1989 | Mahapatra |
| 5,015,052 A | * | 5/1991 | Ridgway et al. ............... 385/2 |
| 5,157,746 A | | 10/1992 | Tobita et al. |
| 5,281,305 A | | 1/1994 | Lee et al. |
| 5,473,721 A | | 12/1995 | Myers et al. |
| 5,675,691 A | | 10/1997 | Edlinger et al. |
| 5,684,909 A | * | 11/1997 | Liu ........................... 385/127 |
| 5,909,529 A | | 6/1999 | Bhagavatula |
| 5,949,943 A | | 9/1999 | Watanabe et al. |
| 6,084,050 A | * | 7/2000 | Ooba et al. .................. 385/143 |
| 6,306,563 B1 | * | 10/2001 | Xu et al. ..................... 385/131 |
| 6,449,404 B1 | * | 9/2002 | Paiam ........................... 385/16 |

FOREIGN PATENT DOCUMENTS

| | | |
|---|---|---|
| CA | 2 259 350 A | 7/2000 |
| EP | 0-297-652 | 1/1981 |
| EP | 0 589 268 A | 3/1994 |
| EP | 0 622 647 A | 11/1994 |
| EP | 0 964 305 A | 11/1994 |
| GB | 2-133-900 A | 8/1984 |
| JP | 58-113903 | 7/1983 |
| JP | 63-250607 | 10/1988 |
| JP | 02-087103 A | 3/1990 |
| JP | 02-168206 | 6/1990 |
| JP | 06-194536 | 7/1994 |
| JP | 08-286065 | 11/1996 |
| JP | 08-320422 | 12/1996 |
| JP | 10-090539 | 4/1998 |
| JP | 10-148729 | 6/1998 |
| JP | 11-023875 | 1/1999 |
| JP | 11-223735 | 8/1999 |

OTHER PUBLICATIONS

Japanese Office Action for Japanese Application 2001–250819 mailed Jul. 29, 2003.
European Search Report for EP 01 12 0159, dated Dec. 12, 2003.
European Search Report for EP 01 120159, dated Aug. 1, 2003.
Najafi, S.I., et al, "Sol–Gel Glass Waveguide and Grating on Silicon", Journal of Lightware Technology, Sep. 1, 1998, pp. 1640–1646, vol. 16, No. 9. IEEE, New York, US (p.1640–1641, Section III, Figs. 1–4, 5A, C)

\* cited by examiner

*Primary Examiner*—Euncha P. Cherry
(74) *Attorney, Agent, or Firm*—RatnerPrestia

(57) ABSTRACT

An optical element has a substrate having or not having a channel for optical waveguide; and a material which has a refractive index higher than that of the substrate and is filled in the channel for optical waveguide or is disposed on the substrate; wherein the refractive index in a part of the material varies substantially periodically or is substantially continuously monotone increasing or decreasing in the direction of light propagation.

6 Claims, 11 Drawing Sheets

118
114
111

OPTICAL ELEMENT AND METHOD OF FABRICATION THEREOF

BACKGROUND OF THE INVENTION

1. Field of the Invention

The present invention relates to an optical element having the functions of diffraction, branching, filtering, and the like and used mainly in optical communications, and a method of fabrication thereof.

2. Related Art of the Invention

In recent public telecommunication and computer networks, optical communications having broadband capability is widely used in order to improve the speed and performance. Further, widely spreading are optical communications systems using wavelength division multiplexing and interactive (two-way) transmission.

In the optical communications industry, various optical integrated circuits having diverse functions are now under development for the application of sophisticated optical signal processing. An essential element in the optical integrated circuits is an optical waveguide. The optical waveguide is a device in which a core region having a higher refractive index is surrounded by a clad layer having a lower refractive index, whereby light is constrained within the core region and propagates therethrough. In the optical waveguide, various functions of diffraction, branching, filtering, and the like are implemented by arrangement of a core pattern. In particular, quartz optical waveguides have various advantages of low power loss, physical and chemical stability, and good matching with optical fibers, and are used as typical passive optical waveguides.

In a typical method of fabrication of optical waveguides, a flame sedimentation technique is used for core/clad film formation, while a reactive ion etching technique is used for core pattern formation. For the core/clad film formation, proposed techniques other than the flame sedimentation technique are a CVD technique, a vacuum deposition technique, a sputtering technique, and the like.

Nevertheless, in such optical modules, there have been the following problems in cost and productivity.

Although many methods are proposed, at present, there is no method of fabrication of optical waveguides satisfying sufficient performance, mass-productivity, and low cost condition. This is because each method of film formation has advantages and disadvantages. For example, in the flame sedimentation technique and the CVD technique, high quality core is obtained. Nevertheless, the flame sedimentation technique requires a plural times of high temperature annealing at 1,000° C. or higher during about ten hours. On the other hand, the CVD technique has disadvantages such as a smaller film formation area in mass-productivity. Further, the electron beam (vacuum) deposition technique and the sputtering technique realize the formation of low power-loss film. Nevertheless, the slow film formation rate of these techniques causes a problem in cost, because the film thickness of 10 μm to a few tens μm is generally necessary in the fabrication process of optical waveguides.

FIG. 11 is a diagram showing an example of a prior art method of fabrication of an optical element.

First, quartz material 114 to serve as a core is sedimented onto a substrate 111 by flame sedimentation technique (FIG. 11(a)). The quartz material 114 has a refractive index higher than that of the substrate 111, whereby the material works as an optical waveguide. Next, photoresist 118 is applied onto the quartz material 114 (FIG. 11(b)), and then undergoes baking process, exposure process under a photomask having a desired pattern, and development process. Then, the photoresist 118 is patterned (FIG. 11(c)).

Then, the quartz material 114 together with the substrate 111 undergoes etching process, thereby being patterned. At that time, the photoresist 118 serves as a mask, thereby causing the quartz material 114 to have a desired pattern (FIG. 11(d)). After that, the photoresist 118 of mask is removed (FIG. 11(e)) Similarly, photoresist is applied onto the patterned portion, and then undergoes exposure process under a photomask having a periodical pattern, development process, and etching process. Then, periodical grooves are formed in the patterned portion, and hence a desired optical element is obtained (FIG. 11(f))

SUMMARY OF THE INVENTION

Taking the above-mentioned problems in the conventional method of fabrication of optical elements onto consideration, an object of the present invention is to provide an optical element satisfying sufficient performance, mass-production capability with low cost condition, and a method of fabrication thereof.

One aspect of the present invention is an optical element comprising: a substrate having or not having a channel for optical waveguide; and a material which has a refractive index higher than that of said substrate and is filled in said channel for optical waveguide or is disposed on said substrate; wherein the refractive index in a part of said material varies substantially periodically or is substantially continuously monotone increasing or decreasing in the direction of light propagation.

Another aspect of the present invention is an optical element the refractive index in a part of said material varies substantially periodically or is substantially continuously monotone increasing or decreasing in the direction substantially perpendicular to said direction of light propagation.

Still another aspect of the present invention is an optical element comprising: a substrate having or not having a channel for optical waveguide; and a material which has a refractive index higher than that of said substrate and is filled in said channel for optical waveguide or is disposd on said substrate; wherein the refractive index in a part of said material varies substantially periodically or is substantially continuously monotone increasing or decreasing in a direction substantially perpendicular to the direction of light propagation.

Yet still another aspect of the present invention is an optical element comprising: a substrate having or not having a channel for optical waveguide; and a resin which has a refractive index higher than that of said substrate and is filled in said channel for optical waveguide or is disposed on said substrate; wherein the refractive index in a part of said resin varies in the direction of light propagation and/or in a direction substantially perpendicular to said direction of light propagation.

Still yet another aspect of the present invention is an optical element according to 4th invention, said part of resin the refractive index of which varies is formed using the photo-hardening or thermo-hardening property of said resin.

A further aspect of the present invention is an optical element comprising: a substrate having or not having a channel for optical waveguide; and a material which has a refractive index higher than that of said substrate and is filled in said channel for optical waveguide or is disposed on said substrate; wherein said optical element further comprises temperature controlling elements disposed on said material and for partially changing the temperature of said material in the direction of light propagation and/or in a direction substantially perpendicular to said direction of light propagation.

A still further aspect of the present invention is an optical element comprising: a substrate having or not having a channel for optical waveguide; and a material which has a refractive index higher than that of said substrate and is filled in said channel for optical waveguide or is disposed on said substrate; wherein said optical element further comprises electrodes disposed on said material and for partially changing the electric field in said material in the direction of light propagation and/or in a direction substantially perpendicular to said direction of light propagation.

A yet further aspect of the present invention is an optical element comprising: a substrate having or not having a channel for optical waveguide; and a material which has a refractive index higher than that of said substrate and is filled in said channel for optical waveguide or is disposed on said substrate; wherein said optical element further comprises a part where said material protrudes to the direction of said substrate and/or a part where said substrate protrudes to the direction of said material, in the direction of light propagation and/or in a direction substantially perpendicular to said direction of light propagation.

A still yet further aspect of the present invention is an optical element, wherein said protruding parts are provided substantially periodically.

An additional aspect of the present invention is an optical element, wherein said material is composed of glass material or resin.

A still additional aspect of the present invention is in a method of fabrication of optical element, wherein photo-hardening resin is formed in a substrate, and wherein light is irradiated onto said photo-hardening resin, thereby hardening said photo-hardening resin, a method of fabrication of optical element wherein the amount of said light irradiated onto the surface of said photo-hardening resin is varied.

A yet additional aspect of the present invention is a method of fabrication of optical element, wherein the amount of said light irradiation is varied substantially periodically or is substantially continuously monotone increasing or decreasing, in a predetermined direction on the surface of said photo-hardening resin.

A still yet additional aspect of the present invention is a method of fabrication of optical element, wherein the intensity of said light irradiation onto said photo-hardening resin is varied, whereby the amount of said light irradiation onto the surface of said photo-hardeninkresin is varied.

A supplementary aspect of the present invention is a method of fabrication of optical element, wherein a mask having partially different light transmissivity is used, whereby the intensity of said light irradiation onto the surface of said photo-hardening resin is varied.

A still supplementary aspect of the present invention is a method of fabrication of optical element, wherein a light shielding plate is used so as to sequentially change the region irradiated by said light, whereby the amount of said light irradiation onto is varied.

A yet supplementary aspect of the present invention is in a method of fabrication of optical element, wherein photo-hardening resin is formed in a substrate, and wherein light is irradiated onto said photo-hardening resin, thereby hardening said photo-hardening resin, a method of fabrication of optical element, wherein another optical component is connected to said photo-hardening resin, and then said photo-hardening resin is hardened, whereby said optical component is fixed to said photo-hardening resin.

A still yet supplementary aspect of the present invention is a method of fabrication of an optical element, wherein said channel for optical waveguide in said substrate is formed in a integrated manner using a mold having rotrusion and recess in the surface thereof.

Another aspect of the present invention is a method of fabrication of an optical element, wherein the protrusion and recess in said substrate of said optical element is formed in a integrated manner using a mold having protrusion and recess in the surface thereof.

BRIEF DESCRIPTION OF THE DRAWINGS

[FIG. 1]

FIGS. 2a-b are diagrams showing the function of an optical-waveguide type diffraction grating according to a first embodiment of the invention.

FIGS. 3a-d are diagrams showing an optical element according to a second embodiment of the invention.

FIG. 4 is a diagram showing an optical element according to a third embodiment of the invention.

FIGS. 5a-b are diagrams showing an optical element according to a fourth embodiment of the invention.

FIGS. 6a-b are diagrams showing an optical element according to a fifth embodiment of the invention.

FIG. 7 is a diagram showing a method of fabrication of an optical element according to a sixth embodiment of the invention.

FIG. 8 is a diagram showing a method of fabrication of an optical element according to a seventh embodiment of the invention.

FIG. 9 is a diagram showing a method of fabrication of an optical element according to an eighth embodiment of the invention.

FIG. 10 is a diagram showing a method of fabrication of an optical element according to a ninth embodiment of the invention.

FIG. 11 is a diagram showing the prior art method of fabrication of an optical element.

Figure 1A:
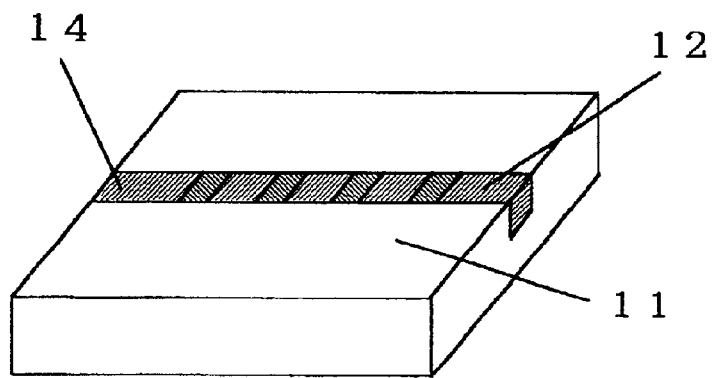
FIGS. 1a-b are diagrams showing an optical element according to a first embodiment of the invention.

DESCRIPTION OF THE REFERENCE NUMERALS 11, 21, 31, 41, 51, 61, 71, 81, 91, 101, 111 Substrate
12, 22, 42 Channel for optical waveguide 14, 24, 34, 44, 54, 64, 74, 84, 94, 104 Resin
15 Phase mask
43 Protrusion and recess portion
55 Temperature controlling element
66 Electrode
93 Light shielding plate
107 Optical fiber
114 Quartz material
118 Photoresist

PREFERRED EMBODIMENTS OF THE INVENTION

The embodiments of the invention are described below with reference to the drawings. Like numerals designates the like parts throughout the drawings.

First Embodiment

Figure 1B:
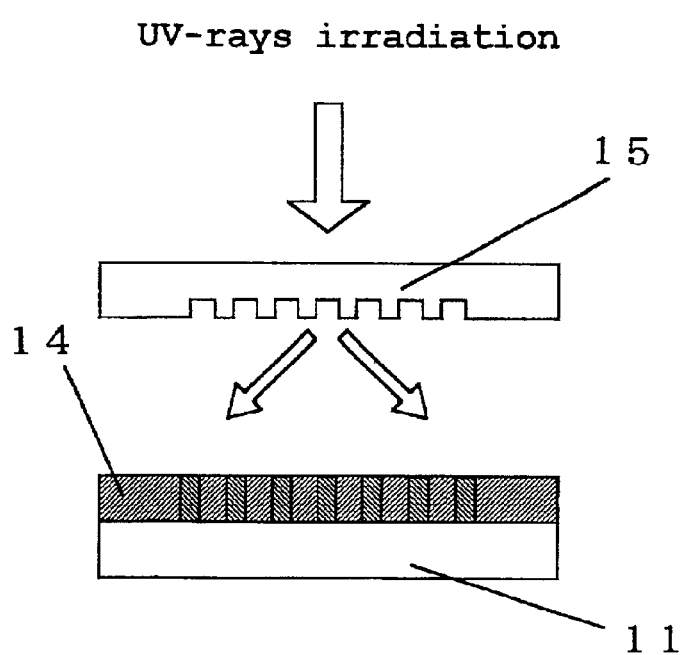

FIG. 1 is a diagram showing an optical element according to a first embodiment of the invention.

First, as shown in FIG. 1, a channel 12 for optical waveguide is formed in the surface of a substrate 11 composed of glass or transparent resin, in a process using a mold (not shown).

Ultra-violet (hereafter described as UV-rays) hardening resin 14 is applied onto the formed channel surface for optical waveguide, thereby filling in the channel. After that, the UV-rays hardening resin 14 in the channel is hardened by UV-rays irradiation. The UV-rays hardening resin 14 has a refractive index higher than that of the substrate 11, whereby the UV-rays hardening resin 14 in the channel works as an optical waveguide core.

The refractive index of the UV-rays hardening resin after irradiation varies within the range of 0.001 depending on the amount of irradiated light. Accordingly, when light having periodical intensity distribution is irradiated onto the UV-rays hardening resin 14 in the channel, periodical distribution of refractive index is formed in the UV-rays hardening resin 14 (FIG. 1(a)). In the irradiation, used is a phase mask technique in which a periodical pattern is formed by the interference phenomenon of light (FIG. 1(b)). Here, it should be noted that the UV-rays hardening resin is hardened by polymerization reaction triggered by UV-rays irradiation, and that a difference in the amount of irradiated light causes a difference in the degree of the reaction and hence a difference in the refractive index.

Figure 2:
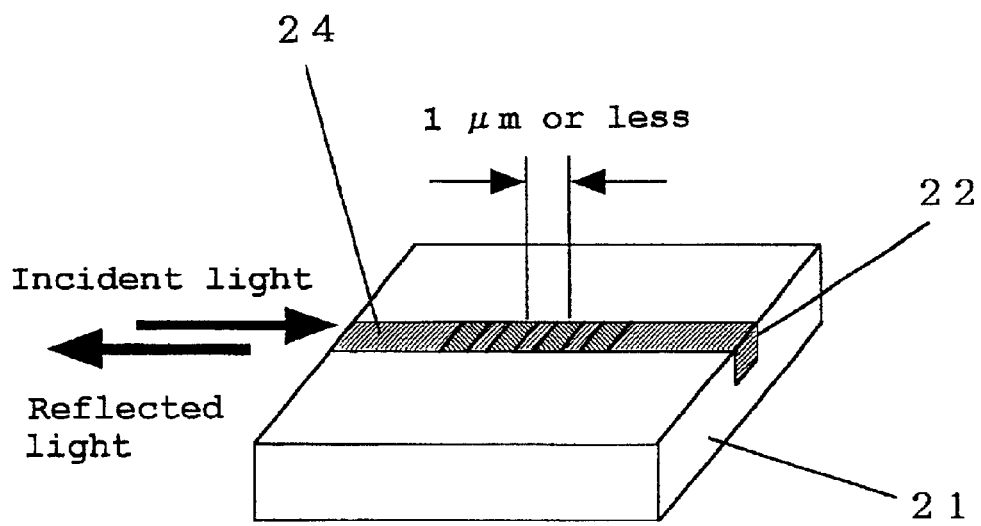
[FIG. 2]
Figure 2:
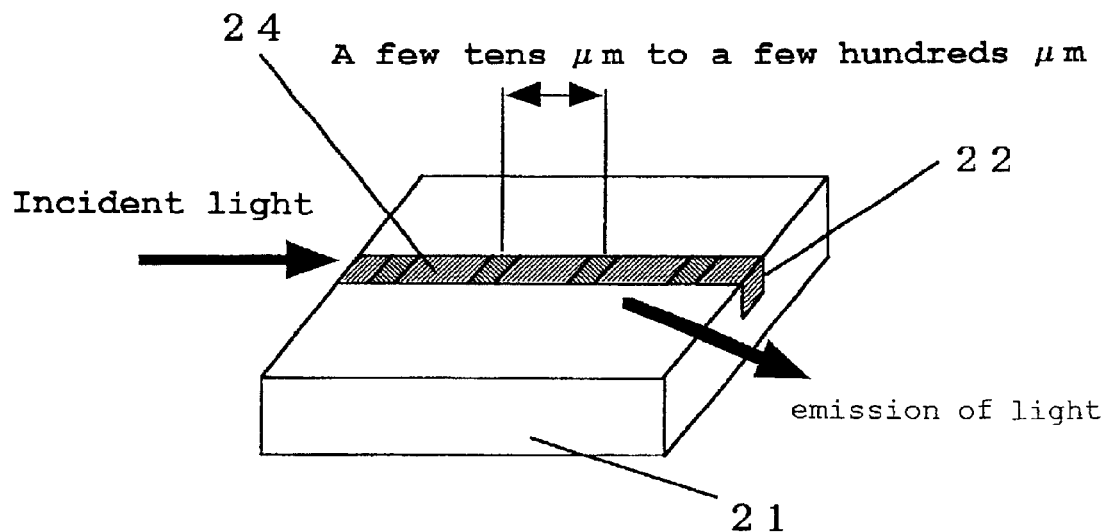

The periodical distribution of refractive index realizes an optical-waveguide type diffraction grating. As shown in FIG. 2(a), when the period of refractive index variation is set to be 1 $\mu$m or less, light of a specific wavelength is reflected to the direction reverse to the incident direction. Here, the specific wavelength is determined by the refractive index and the period of refractive index variation. Further, as shown in FIG. 2(b), when the period of refractive index variation is set to be a few tens $\mu$m to a few hundreds $\mu$m, light of a specific wavelength is released to the outside of the core, thereby suffering a loss. Accordingly, both elements of FIGS. 2(a) and 2(b) serve as filters. Also in the case of FIG. 2(b), the specific wavelength is determined by the refractive index and the period of refractive index variation.

In the present embodiment, UV-rays hardening resin has been used as the material of the channels for optical waveguide cores. However, the material to be used is not restricted to this, and may be thermo-hardening resin. At that time, the temperature for hardening is varied part by part. Further, in the present embodiment, phase mask technique has been used in light irradiation. However, the method to be used is not restricted to this, and interference exposure technique may be used. Further, a photomask having periodically varying transmissivity maybe used. Furthermore, scanning by laser light irradiation or electron beam irradiation may be used.

Further, in the present embodiment, periodical distribution of refractive index has been used. However, the distribution to be used is not restricted to this, and the refractive index may vary in part non-periodically. From the viewpoint of productivity, the channel for optical waveguide is preferably formed by molding process as described above in the present embodiment. However, the method to be used is not restricted to this, and the channel may be formed by etching process when necessary.

Second Embodiment

Figure 3:
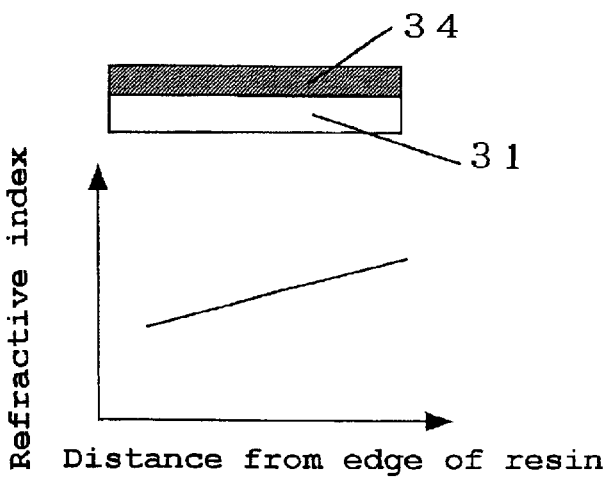
[FIG. 3]
Figure 3:
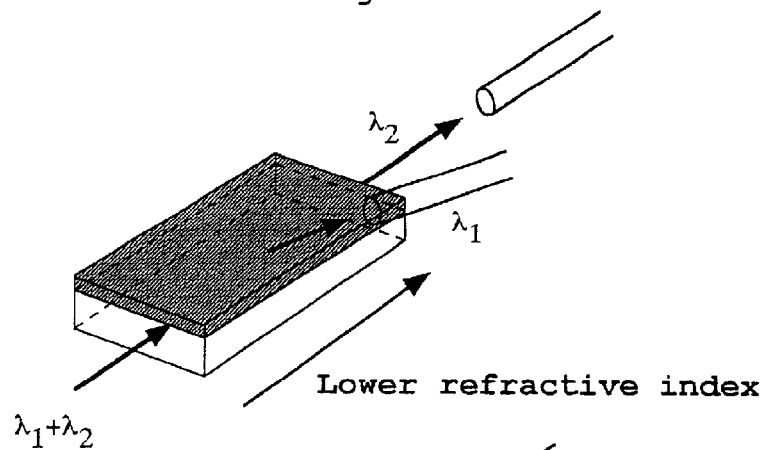
Figure 3:
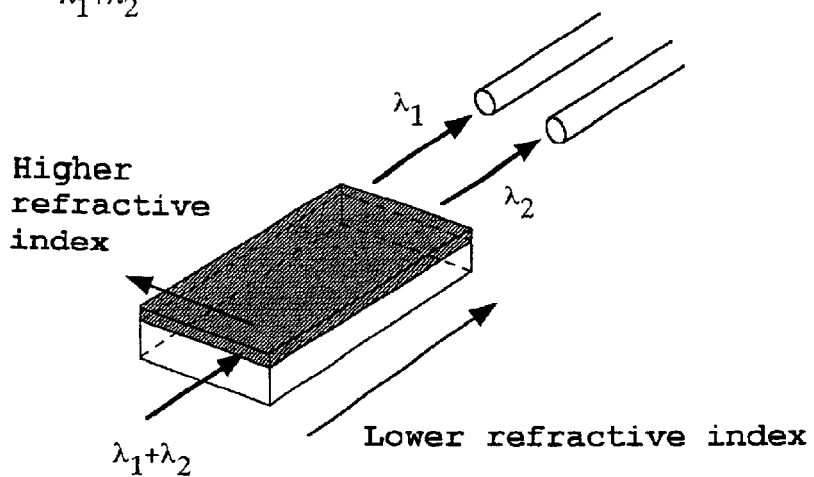
Figure 3:
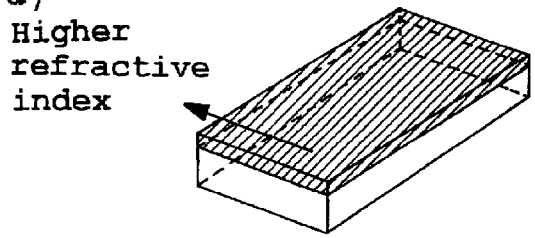

FIG. 3 is a diagram showing an optical element according to a second embodiment of the invention.

As shown in FIG. 3(a), UV-rays hardening resin 34 is applied onto the surface of a substrate 31 composed of glass or transparent resin, thereby forming a film. The UV-rays hardening resin 34 has a refractive index higher than that of the substrate 31, whereby the UV-rays hardening resin 34 in the film form works as an optical waveguide core.

Then, the UV-rays hardening resin 34 in the film form is irradiated by light. At that time, a light shielding plate is sequentially moved so that the light irradiated region on the UV-rays hardening resin changes sequentially. Accordingly, the amount of light irradiation varies part by part on the UV-rays hardening resin. As a result, the resin after hardening has a substantially monotone increasing distribution of refractive index. When the velocity of the movement of the light shielding plate is adjusted, a distribution of refractive index is obtained as desired.

FIG. 3(b) shows the case in which light composed of two distinct wavelengths $\lambda 1$ and $\lambda 2$ is incident. The refractive index is distributed so as to be substantially monotone decreasing in the direction of light propagation. The light propagates through the part having a larger difference in refractive index between the substrate and the resin. Nevertheless, as the light further propagates through the optical waveguide, the difference in refractive index decreases, whereby the waveguide condition becomes not satisfied. At that time, the light is emitted. Since the condition of emission depends on the wavelength of the light, the position of emission varies depending on the wavelength. When an optical fiber is arranged in the position of emission for the light of each wavelength, the light of a desired wavelength is selectively extracted.

In addition, as shown in FIG. 3(c), when the refractive index is further distributed so as to be substantially monotone increasing in a direction substantially perpendicular to the direction of light propagation, the direction of light propagation is changed. Accordingly, wavelength separation is carried out during the propagation. When an optical fiber is arranged in the suitable position of the end of the film, from which the light of each wavelength is emitted, the light of a desired wavelength is selectively extracted. In FIG. 3(c) the refractive index has been distributed so as to be substantially monotone increasing in both the direction (or reverse to the direction) of light propagation and a direction substantially perpendicular to the direction of light propagation. However, as shown in FIG. 3(d), the refractive index may be distributed so as to be substantially monotone increasing only in a direction substantially perpendicular to the direction of light propagation.

From the viewpoint of productivity, the distribution of refractive index is preferably formed by light irradiation process using a light shielding plate as described above in the present embodiment. However, the method to be used is not restricted to this, and a mask having continuous transmissivity may be used for the distribution formation when necessary.

Further, in the present embodiment, a film has been sedimented on a substrate. However, the film may be formed by resin filled between two substrates. That is, similarly to the first embodiment, UV-rays hardening resin may be filled in a channel for optical waveguide in a substrate having the channel for optical waveguide. And then, the amount of light irradiated onto the resin may be controlled so that the distribution of refractive index is substantially monotone increasing or decreasing in the direction of the channel for optical waveguide, and finally another substrate may be placed thereon.

Furthermore, in the present embodiment, the distribution of refractive index is varying (substantially monotone increasing or decreasing) over the whole region of a film in a direction. However, a part having a constant refractive index and a part having a discrete change in the refractive index may exist. Further, in the present embodiment, an optical fiber is arranged in the position of light emission. However, a light receiving element such as a photo-diode may be used.

Third Embodiment

Figure 4:
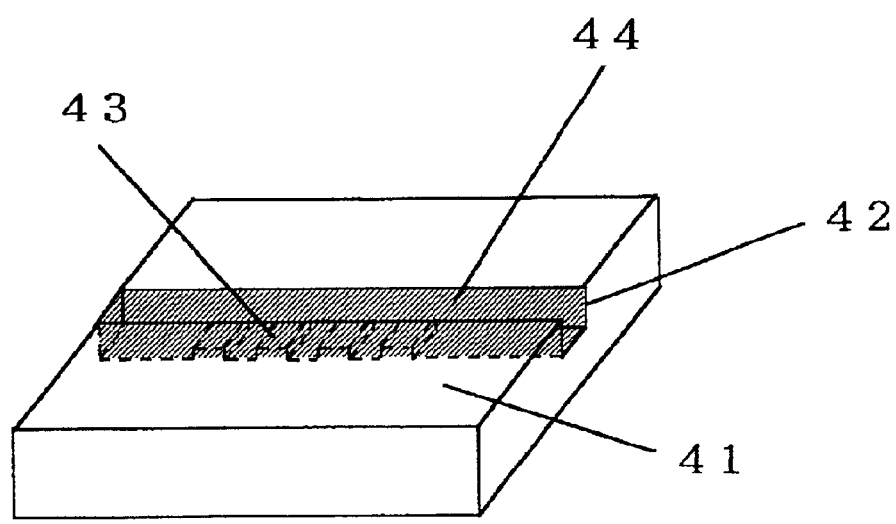
[FIG. 4]

FIG. 4 is a diagram showing an optical element according to a third embodiment of the invention.

First, in a process using a mold (not shown), a channel 42 for optical waveguide is formed in the surface of a substrate 41 composed of glass or transparent resin, while a protrusion and recess portion 43 is formed on the bottom surface of the channel for optical waveguide. Then, UV-rays hardening resin 44 is applied onto the channel 42 for optical waveguide, thereby filling in the channel. After that, the UV-rays hardening resin 44 in the channel is hardened by UV-rays irradiation. The UV-rays hardening resin 44 has a refractive index higher than that of the substrate 41, whereby the UV-rays hardening resin in the channel works as an optical waveguide core.

Since the depth of the core varies depending on the protrusion and recess portion 43, the equivalent refractive index of the UV-rays hardening resin 44 varies periodically, thereby realizing an optical-waveguide type diffraction grating. By adjusting the period of the protrusion and recess portion 43, this optical element works as an optical-waveguide type diffraction grating of either reflection type or long-period type as described above in the first embodiment.

In the present embodiment, UV-rays hardening resin has been used as the material of the channel for optical waveguide core. However, the material to be used is not restricted to this, and may be thermo-hardening resin. Further, from the viewpoint of productivity, the channel for optical waveguide and the protrusion and recess portion are preferably formed by molding process as described above in the present embodiment. However, the method to be used is not restricted to this, and the above-mentioned structure maybe formed by etching process when necessary. Furthermore, another planar substrate may be placed on top as an upper clad.

Further, in the present embodiment, a channel for optical waveguide has been provided in a substrate, and a protrusion and a recess portion has been provided on the bottom surface of the channel for optical waveguide. However, instead of providing the channel for optical waveguide, a protrusion and recess portion may be formed on the substrate surface in the direction of light propagation. And then, UV-rays hardening resin may be arranged thereon, and UV-rays may be irradiated onto a part in a direction of light propagation. Accordingly, an optical element can be obtained. This optical element has the same effect as that of FIG. 4.

Further, in the present embodiment, a protrusion and recess portion has been formed in a channel for optical waveguide in a substrate or on the surface of a substrate in the direction of light propagation. However, a protrusion and recess portion maybe formed in the channel for optical waveguide in the substrate or on the surface of the substrate in both the direction of light propagation and a direction substantially perpendicular to the direction of light propagation or in only a direction substantially perpendicular to the direction of light propagation.

Fourth Embodiment

Figure 5:
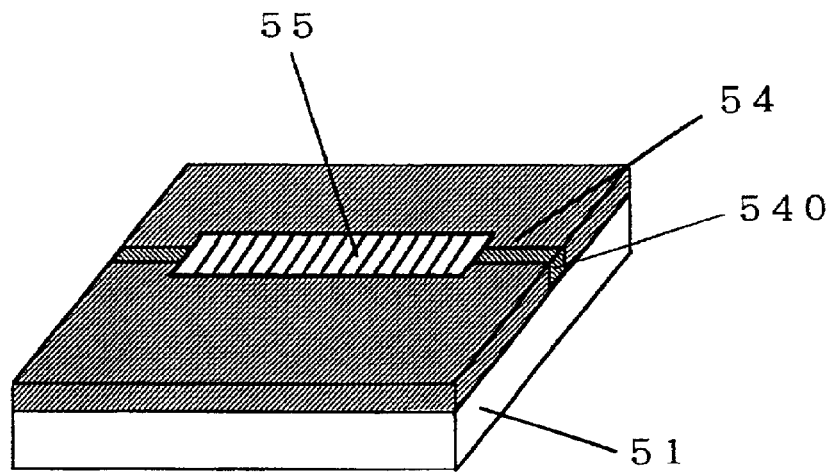
[FIG. 5]
Figure 5:
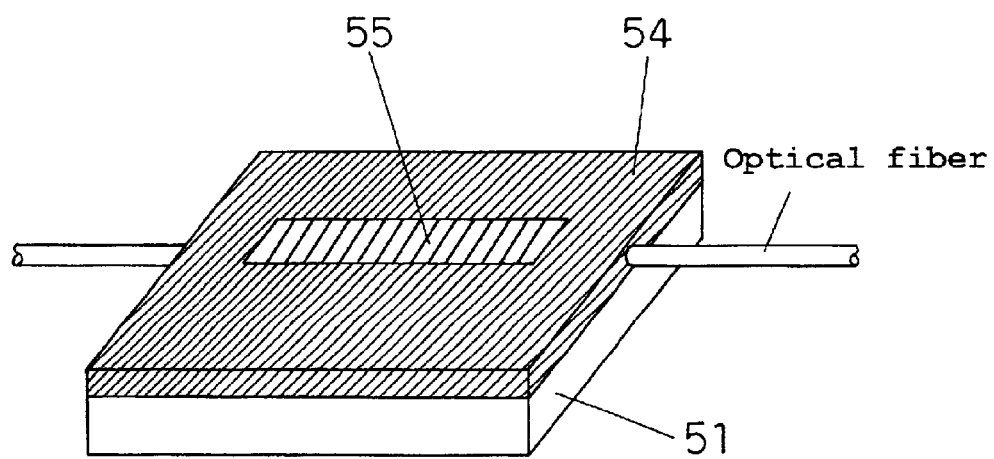

FIG. 5 is a diagram showing an optical element according to a fourth embodiment of the invention.

As shown in FIG. 5(a), UV-rays hardening resin 54 is applied onto the surface of a substrate 51 composed of glass or transparent resin, thereby forming a film. The UV-rays hardening resin 54 has a refractive index higher than that of the substrate 51, whereby the UV-rays hardening resin 54 in the film form works as an optical waveguide core.

Then, the resin 54 which is curable by the UV-rays are irradiated by UV-rays for hardening. At that time, a part 540 of the film is irradiated by the UV-rays with varying the intensity, thereby forming a part 540 having a refractive index higher than that of the other part. Accordingly, light is confined within the part 540 having a refractive index higher than that of the surrounding part, whereby the part works as a three-dimensional optical waveguide.

At last, temperature controlling elements 55 are arranged on the part 540 having a higher refractive index on the film. In use of the optical element according to the present embodiment, the UV-rays hardening resin 540 serving as the optical waveguide is heated up by the temperature controlling elements 55. Accordingly, the temperature of the UV-rays hardening resin 540 varies, and hence the refractive index of the resin varies. When a temperature controlling element 55 on the optical waveguide heats up, the refractive index of its underneath part of the optical waveguide varies. Accordingly, depending on the switching ON/OFF of the temperature controlling elements 55, the optical element works as an optical switch or an optical deflector.

The optical element according to the present embodiment has been described for the case of an optical waveguide having a linear shape. However, the present invention is not restricted to this, and is applicable to any case of optical waveguide pattern generally used. Further, when the temperature is varied periodically, the optical element works as a diffraction grating.

In the present embodiment, temperature controlling elements 55 have been arranged on UV-rays hardening resin 540 having a different refractive index. However, as shown in FIG. 5(b), even in case that the temperature controlling elements 55 are arranged on UV-rays hardening resin 54 having a uniform refractive index, when a temperature controlling element 55 heats up the UV-rays hardening resin 54, a part having a different refractive index is formed within the UV-rays hardening resin 54.

In the present embodiment, a temperature controlling element 55 has heated up the UV-rays hardening resin 54, whereby a part having a different refractive index has been formed within the UV-rays hardening resin 54. At that time, such parts having a different refractive index are not restricted to be generated in only the direction of light propagation, but may be generated in both the direction of light propagation and a direction substantially perpendicular to the direction of light propagation, and may be generated in only a direction substantially perpendicular to the direction of light propagation.

Fifth Embodiment

Figure 6:
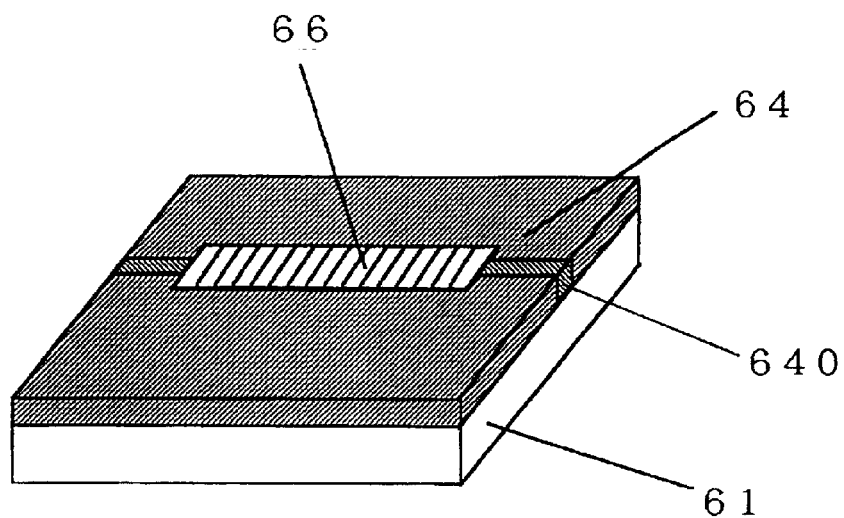
[FIG. 6]
Figure 6:
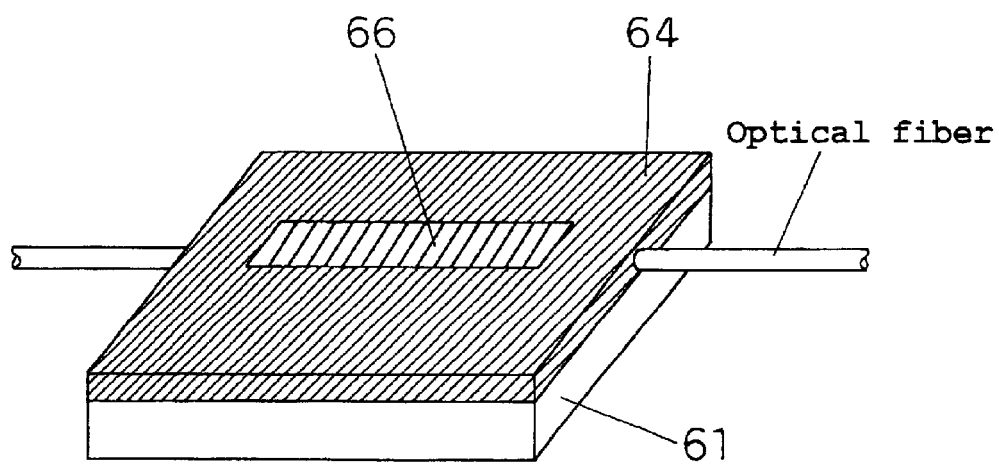

FIG. 6 is a diagram showing an optical element according to a fifth embodiment of the invention.

As shown in FIG. 6(a), UV-rays hardening resin 64 is applied onto the surface of a substrate 61 composed of glass or transparent resin, thereby forming a film. The UV-rays hardening resin 64 has a refractive index higher than that of the substrate 61, whereby the UV-rays hardening resin 64 in the film form works as an optical waveguide core.

Then, the UV-rays hardening resin 64 is hardened by UV-rays irradiation. At that time, a part 640 of the film is irradiated by the UV-rays with varying the intensity, thereby forming a part 640 having a refractive index higher than that of the other part. Accordingly, light is confined within the part 640 having a refractive index higher than that of the surrounding part, whereby the part works as a three-dimensional optical waveguide.

At last, electrodes 66 are arranged on the part 640 having a higher refractive index on the film. In use of the optical element according to the present embodiment, an electric field is applied to the UV-rays hardening resin 640 serving as the optical waveguide by applying a voltage by the electrodes 66. When the electric field applied onto the UV-rays hardening resin 640 is varied, the refractive index of the resin varies. As such, because of the variance in the refractive index of the film, the optical element according to the present embodiment works as an optical modulator or an optical switch of optical-waveguide type.

An opposing electrode to the electrodes 66 may be provided in the interface between the substrate 61 and the resin 64 or on the substrate 61 surface opposite to the surface on which the resin 64 is arranged.

The optical element according to the present embodiment has been described for the case of an optical waveguide having a linear shape. However, the present invention is not restricted to this, and is applicable to any case of optical waveguide pattern generally used. Further, a branching and a directional coupler may be used. Furthermore, in the present embodiment, electrodes have been arranged on the optical waveguide. However, the present invention is not restricted to this, and the electrodes may be arranged on both sides of the optical waveguide. The electrodes may be micro-strip lines or coplanar lines.

In the present embodiment, electrodes 66 have been arranged on UV-rays hardening resin 640 having a different refractive index. However, as shown in FIG. 6(b), even in case that the electrodes 66 are arranged on UV-rays hardening resin 64 having a uniform refractive index, when an electrode 66 applies an electric field onto the UV-rays hardening resin 64, a part having a different refractive index is formed within the UV-rays hardening resin 64.

In the present embodiment, an electrode 66 applies an electric field onto the UV-rays hardening resin 64, whereby a part having a different refractive index has been formed within the UV-rays hardening resin 64. At that time, such parts having a different refractive index are not restricted to be generated in only the direction of light propagation, but may be generated in both the direction of light propagation and a direction substantially perpendicular to the direction of light propagation, and may be generated in only a direction substantially perpendicular to the direction of light propagation.

Sixth Embodiment

Figure 7:
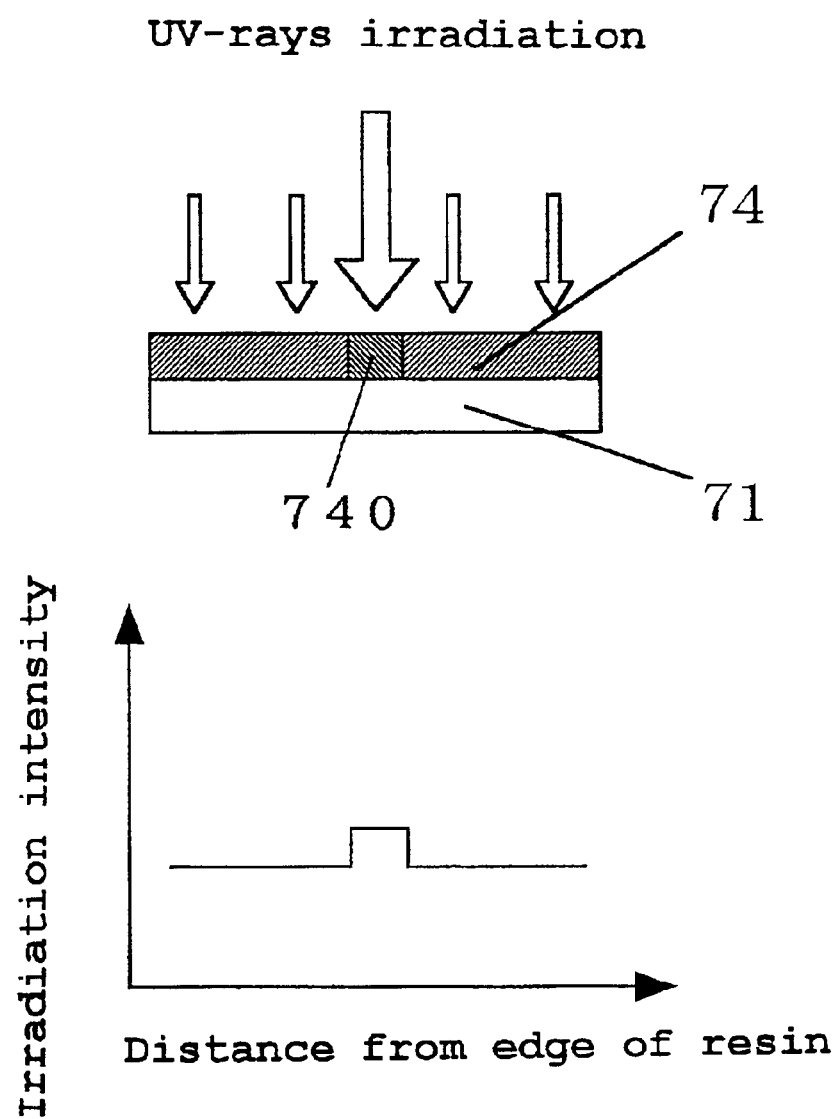
[FIG. 7]

FIG. 7 is a diagram showing a method of fabrication of an optical element according to a sixth embodiment of the invention.

First, UV-rays hardening resin 74 is applied onto the surface of a substrate 71 composed of glass or transparent resin, thereby forming a film. The UV-rays hardening resin 74 has a refractive index higher than that of the substrate 71, whereby the UV-rays hardening resin 74 in the film form works as an optical waveguide core.

Then, the UV-rays hardening resin 74 is hardened by UV-rays irradiation. The refractive index of the UV-rays hardening resin after hardening varies within the range of 0.001 depending on the amount of irradiated light. Accordingly, when a part of the film is irradiated by UV-rays with varying the intensity, the UV-rays hardening resin 74 is hardened, at the same time, a part 740 having a refractive index higher than that of the other part is formed. Accordingly, light is confined within the part 740 having a refractive index higher than that of the surrounding part, whereby the part works as a three-dimensional optical waveguide.

The present embodiment has been described for the case of an optical waveguide having a linear shape. However, the present invention is not restricted to this, and is applicable to any case of optical waveguide pattern generally used. Further, deflection, branching, and coupling of optical waves can be controlled. Furthermore, another planar substrate may be placed as an upper clad.

Seventh Embodiment

Figure 8:
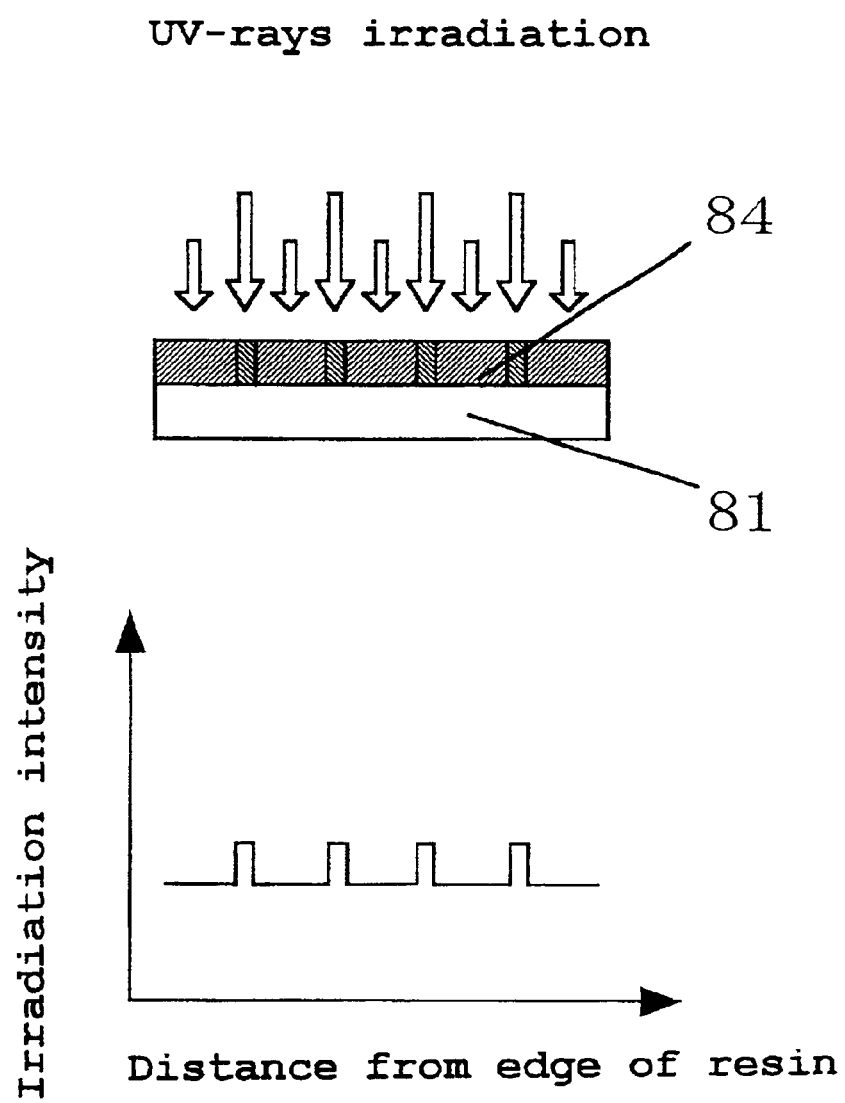
[FIG. 8]

FIG. 8 is a diagram showing a method of fabrication of an optical element according to a seventh embodiment of the invention.

The difference of the present embodiment from the sixth embodiment is that the UV-rays irradiated onto UV-rays hardening resin 84 has periodical intensity distribution. Accordingly, the present embodiment in the other points is the same as the sixth embodiment, unless otherwise mentioned. UV-rays hardening resin 84 is irradiated by UV-rays having periodical intensity distribution, whereby the amount of light irradiated onto the surface of the UV-rays hardening resin 84 is varied periodically. Accordingly, periodical distribution of refractive index is formed in the UV-rays hardening resin 84.

The periodical distribution of refractive index realizes an optical-waveguide type diffraction grating. In the light irradiation, phase mask technique and interference exposure technique may be used. Further, a photomask having periodically varying transmissivity may be used. Furthermore, scanning by laser light irradiation or electron beam irradiation may be used.

Eighth Embodiment

Figure 9:
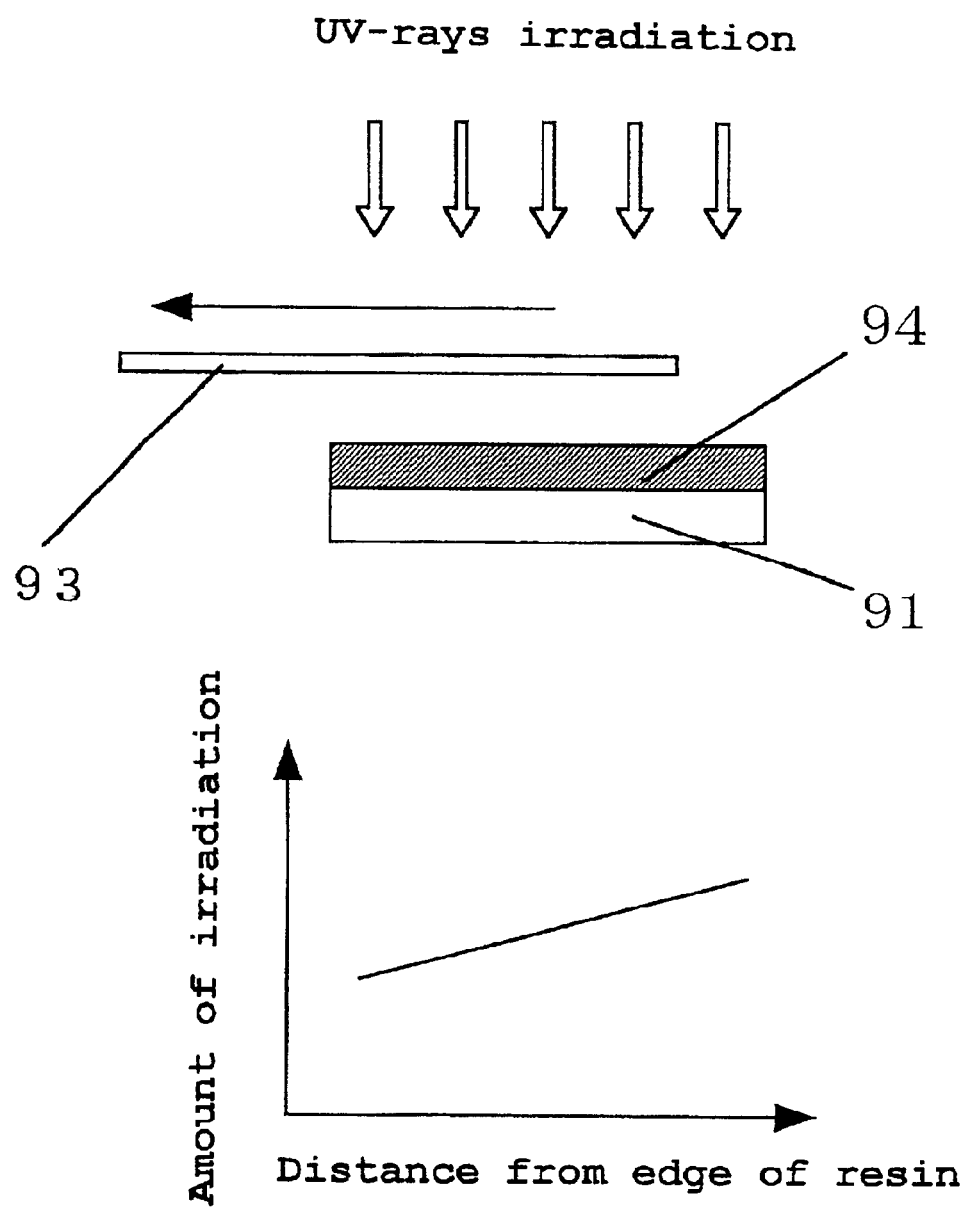
[FIG. 9]

FIG. 9 is a diagram showing a method of fabrication of an optical element according to an eighth embodiment of the invention.

First, UV-rays hardening resin 94 is applied onto the surface of a substrate 91 composed of glass or transparent resin, thereby forming a film. The UV-rays hardening resin 94 has a refractive index higher than that of the substrate 91, whereby the UV-rays hardening resin 94 in the film form works as an optical waveguide core.

Then, the UV-rays hardening resin 94 is hardened by UV-rays irradiation. At that time, a light shielding plate 93 is inserted between the UV-rays hardening resin and a light source. The light shielding plate 93 kept substantially parallel to the substrate 91 is sequentially moved so that the light irradiated region on the UV-rays hardening resin 94 changes sequentially. Accordingly, the amount of light irradiation onto the UV-rays hardening resin 94 varies in a substantially monotone decreasing manner. As a result, continuous distribution of refractive index is formed.

When the velocity of the movement of the light shielding plate is adjusted, arbitrary distribution of refractive index is obtained.

In the present embodiment, a single light shielding plate has been used. However, a plurality of light shielding plates may be used in order to form refractive index distribution continuously varying in a plurality of directions. Further, in the present embodiment, the light shielding plate 93 and hence the region of irradiation have been moved, whereby the amount of irradiation has been changed. However, in the UV-rays irradiation, a mask having continuously varying transmissivity may be used. Furthermore, in the present embodiment, the amount of irradiation has been varied continuously. However, a part having a constant amount of irradiation and a part having a discrete change in the amount of irradiation may exist.

Ninth Embodiment

Figure 10:
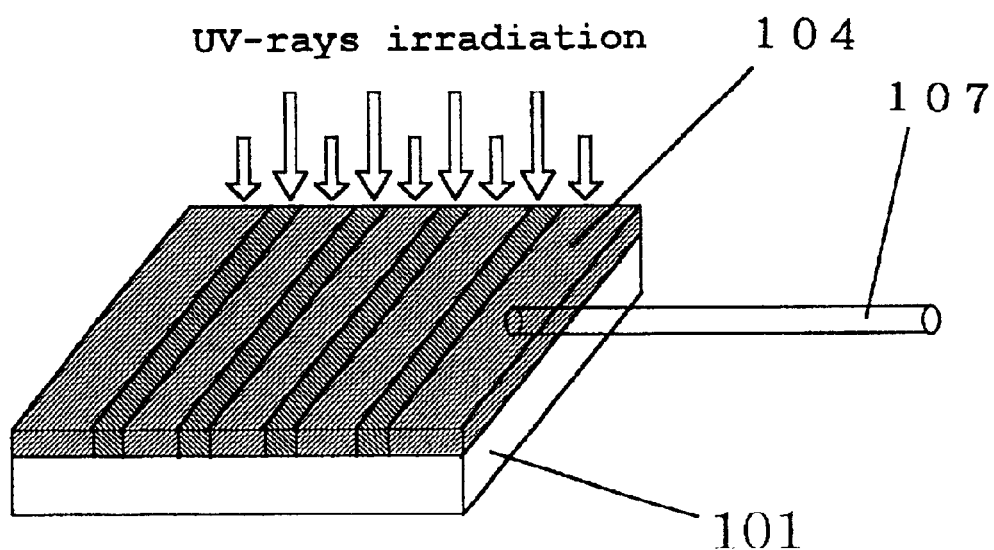
[FIG. 10]
Figure 11:
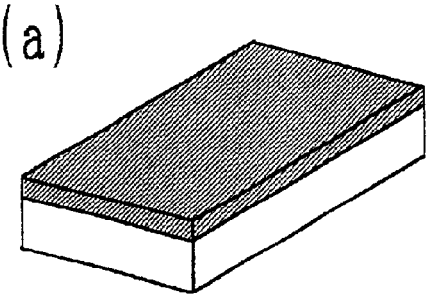
[FIG. 11]
Figure 11:
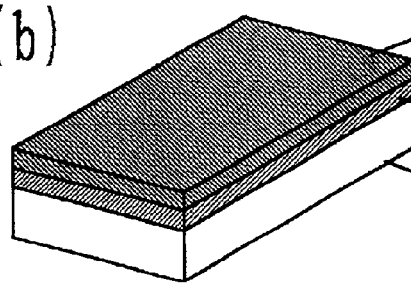
Figure 11:
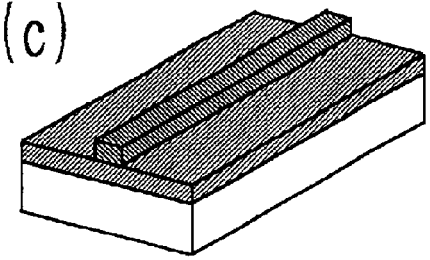
Figure 11:
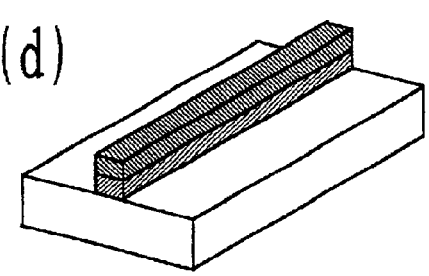
Figure 11:
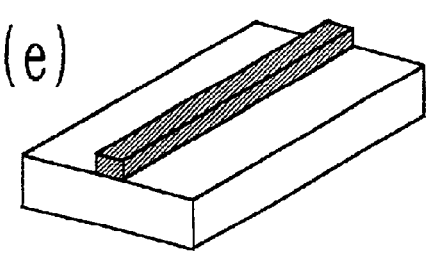
Figure 11:
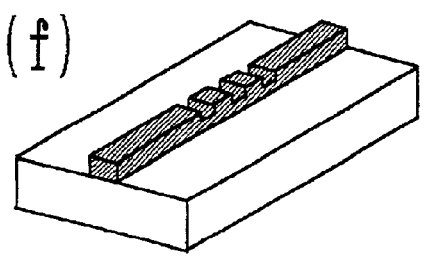

FIG. 10 is a diagram showing a method of fabrication of an optical element according to a ninth embodiment of the invention.

First, as shown in FIG. 10, one end of an optical fiber 107 is placed on the surface of a substrate 101 composed of glass or transparent resin. Then, UV-rays hardening resin 104 is applied thereon. After that, the UV-rays hardening resin 104 is hardened by UV-rays irradiation, whereby the optical fiber 107 is fixed on the substrate 101. The UV-rays hardening resin 104 has a refractive index higher than that of the substrate 101, whereby the UV-rays hardening resin 104 works as an optical waveguide core.

The refractive index of the UV-rays hardening resin after hardening varies depending on the amount of irradiated light. Accordingly, when the UV-rays hardening resin 104 is irradiated by light having periodical intensity distribution, periodical distribution of refractive index is formed in the UV-rays hardening resin 104. This periodical distribution of refractive index realizes a diffraction grating. Accordingly, an optical element is obtained, and at the same time, an optical fiber is connected thereto.

In the present embodiment, UV-rays hardening resin has been used as the material of the channel for optical waveguide core. However, the material to be used is not restricted to this, and may be thermo-hardening resin. Further, in the present embodiment, an optical fiber has been used as another optical element. However, the optical element is not restricted to this, and may be a wavelength filter, an isolator, a mirror, a lens, and the like. Furthermore, in the present embodiment, a diffraction grating has been formed. However, the present embodiment is not restricted to this, and an ordinary optical waveguide may be formed. Further, optical and electrical components, such as light emitting elements, light receiving elements, electrode wiring, and semiconductor devices, may be implemented together.

As described above, the present invention provides an optical element and a method of fabrication thereof, thereby permitting mass production of optical elements such as optical waveguides at a low cost.

What is claimed is:

1. A planar optical waveguide element comprising:
a substrate having a channel for a planar optical waveguide; and
material which has a refractive index higher than of said substrate and is filled in said channel for the planar optical waveguide; wherein:
the refractive index in a part of said material is substantially continuously monotone increasing or decreasing in a direction of light propagation; and
a cross section of the planar optical waveguide is substantially constant along a direction of light propagation.

2. A planar optical waveguide element according to claim 1, the refractive index in a part of said material varies substantially periodically or is substantially continuously monotone increasing or decreasing in a direction substantially perpendicular to said direction of light propagation.

3. A planar optical waveguide element according to any one of claims 1 and 2, wherein said material is composed of glass material or resin.

4. A planar optical waveguide element comprising:
a substrate having a channel for a planar optical waveguide; and
a material which has a refractive index higher than that of said substrate and is filled in said channel for the planar optical waveguide;
wherein the refractive index in a part of said material varies substantially periodically in a direction of light propagation and is substantially continuously monotone increasing or decreasing in a direction substantially perpendicular to said direction of light propagation.

5. A planar optical waveguide element comprising:
a substrate having a channel for a planar optical waveguide; and
a material which has a refractive index higher than that of said substrate and is disposed on said substrate;
wherein;
the refractive index in a part of said material is substantially continuously monotone increasing or decreasing in a direction of light propagation; and
a cross section of the planar optical waveguide is substantially constant along a direction of light propagation.

6. A planar optical waveguide element comprising:
a substrate having a channel for a planar optical waveguide; and
a material which has a refractive index higher than that of said substrate and is disposed on said substrate;
wherein the refractive index in a part of said material varies substantially periodically in a direction of light propagation and is substantially continuously monotone increasing or decreasing in a direction substantially perpendicular to said direction of light propagation.

* * * * *

UNITED STATES PATENT AND TRADEMARK OFFICE
CERTIFICATE OF CORRECTION

PATENT NO. : 6,826,344 B2
DATED : November 30, 2004
INVENTOR(S) : Shimada et al.

It is certified that error appears in the above-identified patent and that said Letters Patent is hereby corrected as shown below:

Title page,
Item [56], References Cited, FOREIGN PATENT DOCUMENTS,
"EP 0 964 305" reference, delete "11/1994" and insert -- 12/1999 --
OTHER PUBLICATIONS, "Najafi, S.I., et al.," reference, "Sol-Gel Glass Waveguide and Grating On Silicon", delete "Lightware" and insert -- Lightwave --

Column 12,
Line 12, before "material" insert -- a --
Line 12, after "than" insert -- that --
Line 14, after "wherein" delete ":" and insert -- ; --

Signed and Sealed this

Twenty-fourth Day of May, 2005

JON W. DUDAS
*Director of the United States Patent and Trademark Office*